US008776228B2

(12) United States Patent
Natarajan et al.

(10) Patent No.: US 8,776,228 B2
(45) Date of Patent: Jul. 8, 2014

(54) TRANSACTION-BASED INTRUSION DETECTION

(75) Inventors: Ramesh Natarajan, Northborough, MA (US); Timothy Gordon Brown, Fort Edward, NY (US); Carrie Elaine Gates, New York, NY (US)

(73) Assignee: CA, Inc., Islandia, NY (US)

( * ) Notice: Subject to any disclaimer, the term of this patent is extended or adjusted under 35 U.S.C. 154(b) by 28 days.

(21) Appl. No.: 13/302,395

(22) Filed: Nov. 22, 2011

(65) Prior Publication Data
US 2013/0133066 A1 May 23, 2013

(51) Int. Cl.
G06F 21/00 (2013.01)
H04L 29/06 (2006.01)

(52) U.S. Cl.
CPC ..... H04L 63/1408 (2013.01); *Y10S 707/99933* (2013.01)
USPC ............ 726/23; 726/3; 726/4; 726/5; 726/22; 709/217; 709/223; 709/224; 707/E17.059; 707/E17.089; 707/751; 707/999.003; 713/188; 714/33; 714/37; 235/376; 235/380

(58) Field of Classification Search
CPC ............ H04L 63/1408; H04L 63/1425; H04L 67/122; G06F 11/3072; G06F 17/30705
USPC ............................................ 235/380; 705/51
See application file for complete search history.

(56) References Cited

U.S. PATENT DOCUMENTS 6,671,811 B1 * 12/2003 Diep et al. ...................... 726/23
7,607,021 B2 * 10/2009 Rayes et al. ................... 713/188
7,770,223 B2 * 8/2010 Shevenell et al. ............... 726/23
7,815,106 B1 * 10/2010 McConnell ................... 235/380
8,042,180 B2 * 10/2011 Gassoway ........................ 726/22
8,201,220 B2 * 6/2012 Casey et al. ...................... 726/3
8,239,925 B2 * 8/2012 Faitelson et al. ................. 726/6
8,438,612 B2 * 5/2013 Faitelson et al. ................. 726/2
2003/0037251 A1 * 2/2003 Frieder et al. ................. 713/200

(Continued)

FOREIGN PATENT DOCUMENTS

WO WO 2006090354 A1 * 8/2006 ............... G06F 1/00

OTHER PUBLICATIONS

Vijayan, Jaikumar, "Hackers are Defeating Tough Authentication, Gartner Warns", *Computer World*, printed from <http://www.computerworld.com/s/article/print/346333/User_Authentication_No_Longer_Thwarts_Online_Bank_Thieves>, Jan. 18, 2010, 1 page.

*Primary Examiner* — Morshed Mehedi
*Assistant Examiner* — Sharon Lynch
(74) *Attorney, Agent, or Firm* — Pillsbury Winthrop Shaw Pittman LLP

(57) ABSTRACT

Systems and methods are provided for intrusion detection. The systems and methods may include receiving transaction information related to one or more current transactions between a client entity and a resource server, accessing a database storing a plurality of transaction groups, analyzing the received transaction information with respect to information related to at least one of the plurality of transaction groups, and based on said analyzing, determining a possibility of an occurrence of an intrusion act at the resource server. The transaction groups may be formed based on a plurality of past transactions between a plurality of client entities and the resource server. Identity information of a user associated with the one or more current transactions may also be received along with the transaction information. The user may be associated with at least one of the plurality of transaction groups.

18 Claims, 3 Drawing Sheets

(56) References Cited

U.S. PATENT DOCUMENTS

| | | | |
|---|---|---|---|
| 2004/0230530 A1* | 11/2004 | Searl et al. | 705/51 |
| 2005/0081139 A1* | 4/2005 | Witwer et al. | 715/501.1 |
| 2005/0086529 A1* | 4/2005 | Buchsbaum | 713/201 |
| 2005/0204162 A1* | 9/2005 | Rayes et al. | 713/201 |
| 2008/0086473 A1* | 4/2008 | Searl et al. | 707/9 |
| 2009/0126014 A1* | 5/2009 | Brady et al. | 726/22 |
| 2009/0234878 A1* | 9/2009 | Herz et al. | 707/102 |
| 2009/0288165 A1* | 11/2009 | Qiu et al. | 726/23 |
| 2010/0162359 A1* | 6/2010 | Casey et al. | 726/3 |
| 2011/0078759 A1* | 3/2011 | Choi et al. | 726/1 |
| 2012/0210428 A1* | 8/2012 | Blackwell | 726/23 |

* cited by examiner

TRANSACTION-BASED INTRUSION DETECTION

FIELD OF THE INVENTION

The invention generally relates to intrusion detection, and more specifically to intrusion detection based on information related to current and past transactions with one or more protected resources.

BACKGROUND OF THE INVENTION

Conventional intrusion detection systems (IDS) typically apply a large number of rules and patterns to detect illegal access or intrusions at a protected resource, service provider, etc. These conventional IDS provide "attack monitoring," that includes monitoring factors associated with characteristics of the originator of the transactions, such as monitoring binary signatures, IP address or address range of the originator of a network call, geo location, time of access and/or other similar factors. Such information may be retrieved from network traffic, and existing solutions may utilize IP address ranges to determine where an attack is coming from or look for specific signatures to determine malicious activity. Such monitoring may be used for spam detection, anti-virus protection, etc. However, such intrusion detection solutions are primarily technology-oriented solutions focused on the characteristics of the resources used for transactions, but do not utilize business intelligence or information related to the transactions to track and detect malicious activity. Moreover, existing solutions fail to provide intrusion detection based on the transactional behavior of a current user within the context of other identities that have similar transactional behavior.

For example, when an attacker finds out the password of a user and logs-in to the user's account at a server associated with a banking system, conventional IDS cannot detect that an illegal user is accessing the banking system. Thus, it is desirable to develop and provide an improved technique that will use transaction information as well as the identity of the user to identify malicious activity in real time.

SUMMARY

In some implementations, a system is provided for determining or detecting one or more acts of intrusion at a resource entity, e.g., an application server, a web server, and/or other protected resources, based on information related to current and past transactions performed at the resource entity. The intrusion detection system may be communicatively coupled with the resource entity, and configured to receive information related to one or more current transactions requested or initiated by a user of a client entity for the resource entity. The intrusion detection system may include a transaction analysis module that may be configured to access a database storing a plurality of transactions groups. The transaction analysis module may be further configured to analyze the received transaction information with respect to information related to one or more of the plurality of transaction groups. Based on the analysis, the transaction analysis module may determine a possibility of occurrence of an intrusion act at the resource entity.

In some implementations, the user associated with the one or more current transactions is also associated with, or is a member of, at least one of the transaction groups. In some implementations, the transaction analysis module is configured to detect an intrusion act, if at least a part of the received transaction information is different than at least a part of the information related to the at least one of the transaction groups. Additionally, or alternatively, the transaction analysis module is configured to detect an intrusion act, if at least a part of the received transaction information is similar to at least a part of the information related to a transaction group other than the transaction group(s) with which the user is associated. Furthermore, intrusion may be detected, if, based on the analysis by the transaction analysis module, the received transaction information is not found to be similar to information related to any of the transaction groups.

In some implementations, the intrusion detection system may include or be communicatively associated with a clustering module that is configured to define and/or form the transaction groups, e.g., based on past transactions between client entities and one or more resources including the resource entity. In some implementations, the transaction analysis module, the clustering module and/or other modules of the intrusion detection system may be or include a computer application, or a plurality of applications capable of communicating with one another, which when executed, perform the intrusion detection features and functions described herein.

In some implementations, a method is provided for detecting intrusion at a resource entity. The method may be executed by one or more processors configured to perform a plurality of operations including receiving transaction information related to one or more current transactions between a client entity and a resource server, accessing a database storing a plurality of transaction groups, analyzing the received transaction information with respect to information related to one or more of the plurality of transaction groups, and based on the analyzing, determining possibility of occurrence of an intrusion act at the resource server. The transaction groups may be formed based on a plurality of past transactions between a plurality of client entities and the resource server (and/or other similar resource entities).

These and other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION OF THE INVENTION

In some implementations, the invention provides systems and methods for detecting intrusion at a resource entity, e.g., an application server, a web server, and/or other protected resources, based on information related to current and past transactions with the resource entity. Generally, intrusion detection may be defined as a process of monitoring activities and/or transactions at a resource entity (e.g., resource server 104) sent from one or more client units (e.g., client entities 106) to determine whether the activities and/or transactions are unauthorized, illegal and/or malicious with respect to the services and/or information provided by the resource entity.

Figure 1:
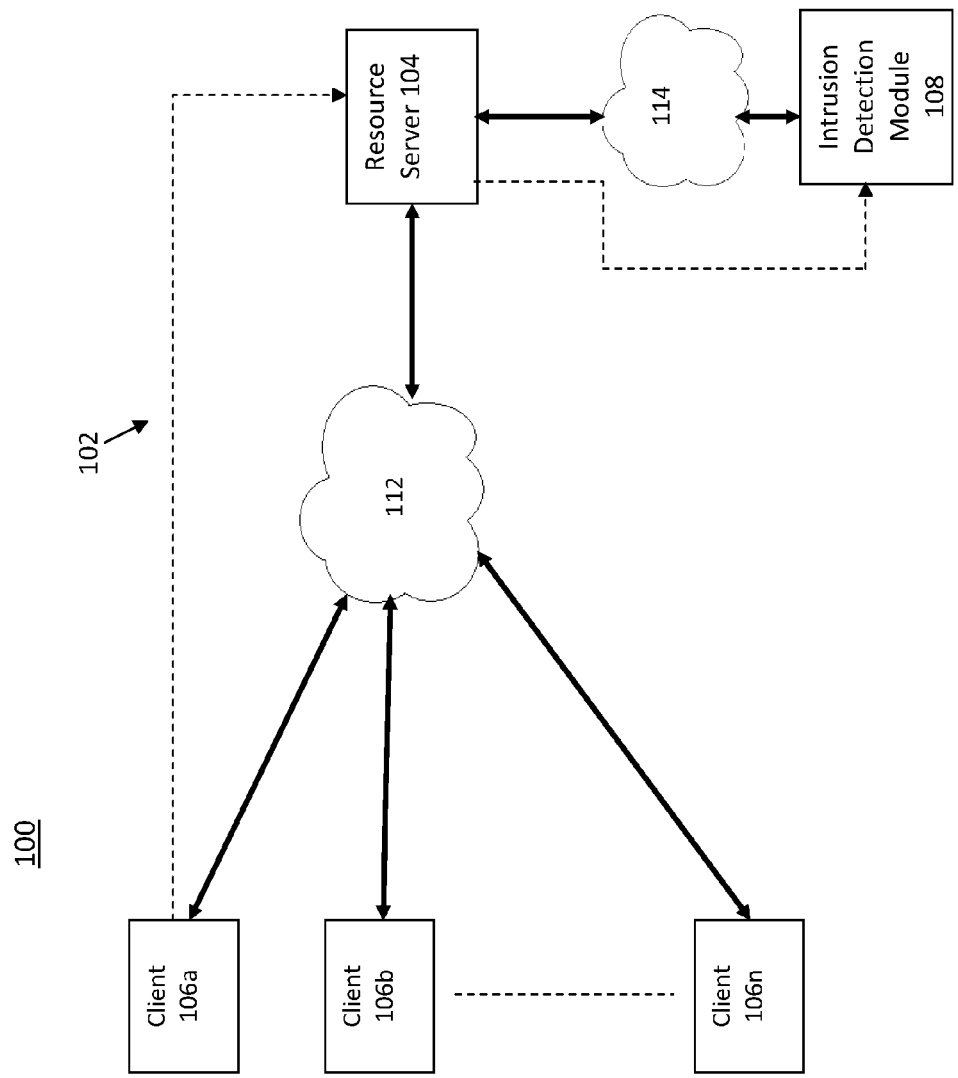
FIG. 1 illustrates an example of an environment that includes a system for intrusion detection, according to various implementations described in this disclosure.

FIG. 1 illustrates an example of an environment 100 in which an exemplary system 102 for intrusion detection resides. As shown, system 102 may include at least one resource server 104 that may be communicatively coupled to and accessed by client entities 106a-106n (e.g., via one or more networks 112) to complete transactions supported by resource server 104. In some implementations, resource server 104 may include a server associated with a banking system that facilitates banking transactions initiated at one or more client entities 106, e.g., by one or more users logged-in at the respective client entities 106. In some other implementations, resource server 104 may include a web server configured to support internet applications, and as such, the transactions or requests sent from client entities 106 to the web server may include uniform resource locator (URL) information and/or other hyper text transfer protocol (http) information. In some other implementations, resource server 104 may include a server configured to support one or more mobile applications (e.g., a social networking application), and, and as such, the transactions or requests sent from (mobile) client entities 106 hosting the mobile application to the server may include data and information (e.g., login information, and other transactional information) related to that mobile application. In addition to, or as an alternative to, being a banking server and/or a web server, resource server 104 may be configured to support other applications or services related to, e.g., cloud computing, mobile computing, inventory management, e-commerce, enterprise management, government and/or defense programs, educational institutions, and/or other areas requiring secure client-server communication. In some implementations, resource server 104 includes a processor, memory/storage, circuitry, and/or other hardware components (not shown) operable to execute computer-readable instructions to perform functions associated with the server's services or applications. Although, only one resource server 104 has been shown, it is for illustrative purposes only. There may be more than one resource servers 104 providing same or different services, and/or supporting same or different applications. In some implementations, system 102 does not include server 104; rather, client entities 106 communicate with each other and process information for one or more applications based on Peer-2-Peer communication protocols. As such, the intrusion detection techniques disclosed herein may utilize data or information directly accessed from, or provided by, client entities 106 (which might otherwise be provided by server 104, in other implementations).

Resource server 104 may be further coupled to a transaction-based intrusion detection module/engine 108. In some implementations, as discussed in detail below, intrusion detection module (IDM) 108 and/or applications installed therein provide the ability to detect intrusion(s) (e.g., an attempt or event of unauthorized access and/or illegal data manipulation) at resource server 104. For example, in some implementations, IDM 108 is configured to analyze one or more characteristics of the transactions received at resource server 104 from client entities 106, and determine whether one or more of those transactions indicate an act of intrusion at resource server 104. In some implementations, environment 100 may include one or more elements (not shown) other than those mentioned above.

Client entities 106 may be connected to resource server 104 directly or via network 112. Further, resource server 104 may be connected with IDM 108 directly or via network 114. Although only one resource server 104 is shown in FIG. 1, this is for illustrative purposes only. In some implementations, there may be a plurality of resource servers 104 connected directly, via one or more networks (e.g., networks 112, 114), or be otherwise connected to one another.

Networks 112, 114 may any any one or more of, for instance, the Internet, an intranet, a PAN (Personal Area Network), a LAN (Local Area Network), a WAN (Wide Area Network), a SAN (Storage Area Network), or a MAN (Metropolitan Area Network). Any suitable communications link may be utilized, including any one or more of, for instance, a copper telephone line, a Digital Subscriber Line (DSL) connection, a Digital Data Service (DDS) connection, an Ethernet connection, an Integrated Services Digital Network (ISDN) line, an analog modem connection, a cable modem connection, or other connection. One or more security technologies may be used to ensure the security of information across all parts of the system, where necessary. For example Secure Socket Layer (SSL) protocol and bank level SSL may be utilized to ensure the authenticity and security of messages passed across the network. In some implementations, networks 112, 114 are implemented using fiber channels. It will be appreciated that this is not intended to be limiting, and that the scope of this disclosure includes implementations in which resource server 104, client entities 106a-106n, and/or IDM 108 are operatively linked via some other communication methodology, e.g., via a direct wired or wireless connection.

In some implementations, client entities 106a-106n each may include a processor, circuitry, and/or other hardware components (not shown) operable to execute computer-readable instructions to perform functions described herein. Client entities 106a-106n may be stand-alone computing devices, e.g., laptops, desktops, or wireless devices (e.g., smartphones, personal digital assistants, etc.) operated by an end user. Client entities 106a-106n (or end users operating those devices) may be a part of one or more organization, and as such may be identified using certain identification information such as, e.g., department number, employee number, etc. In some implementations, users/operators are able to access client entities 106a-106n using specific log-in information (e.g., username, password, biometric information and/or other information) assigned to the respective user/operator. In some embodiments, users/operators of client entities 106a-106n may submit their requests and/or transactions related to applications/services supported by server 104 at their respective devices to access resource server 104, e.g., via a web services interface, and/or other application-specific interfaces. In some implementations, one or more controlling client entities 106 (or other devices/entities (not shown)) may control one or more other controlled client entities 106, such that transactions generated by the controlling entities is transmitted via the controlled entities. In some implementations, similar transactions initiated at two or more different client entities are combined or repackaged (e.g., by a transaction-combining application—not shown) into one or more transactions, and then sent to resource server 104 for processing.

Figure 2:
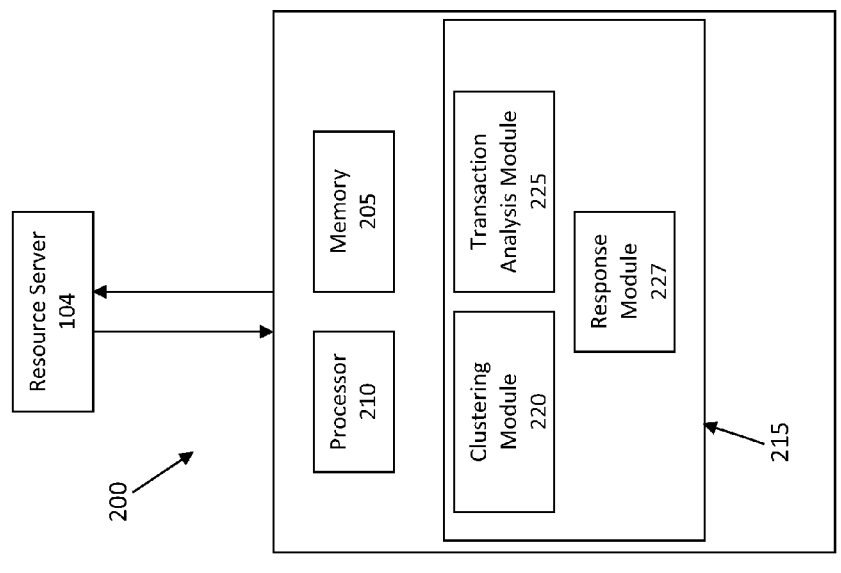
FIG. 2 illustrates an exemplary intrusion detection system, according to various implementations described in this disclosure.

FIG. 2 illustrates a block diagram 200 which illustrates an example of IDM 108 according to some implementations. For example, as shown, IDM 108 may include a memory 205. Although memory 205 is depicted as a single unit in IDM 108, they may be two or more memories or other storage units. Memory 205 may comprise electronic storage media that electronically stores information. Such electronic storage media may be provided integrally (i.e., substantially non-removable) to IDM 108 and/or as removable storage that is removably connectable to IDM 108 via, for example, a port (e.g., a USB port, a FireWire port, etc.) or a drive (e.g., a disk drive, etc.). Memory 205 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Memory 205 may store information or data including, but not limited to, a database of transaction groups, information related to one or more current and/or past transactions between client entities 106 and resource server 104, identity information of one or more users associated with the transaction groups and/or current transactions, and other information related to and that enables intrusion detection by IDM 108 and/or modules therein.

In some implementations, IDM 108 includes a processor 210 that may be configured to provide information processing capabilities in IDM 108, e.g., with regard to forming and updating transaction groups and intrusion detection. Processor 210 may include one or more of a digital processor, an analog processor, a digital circuit designed to process information, an analog circuit designed to process information, a state machine, and/or other mechanisms for electronically processing information. Although processor 210 is shown in FIG. 2 as a single entity, this is for illustrative purposes only. In some implementations, processor 210 may include a plurality of processing units. These processing units may be physically located within the same device or computing platform, or processor 210 may represent processing functionality of a plurality of devices operating in coordination.

In some implementations, IDM 108 may run or operate an intrusion detection application 215 for detecting intrusion at resource server 104. Intrusion detection application 215 may be or may include a computer application (or plurality of applications capable of communicating with one another) having one or more modules for performing the features and functions described herein, such as, for example, a clustering module 220, a transaction analysis module (TAM) 225 and a response module 227. In some implementations, the modules of application 215 may include computer executable instructions embodied on computer readable storage media, e.g., memory 205. These computer executable instructions may be used to configure, e.g., processor 210 of IDM 108 for performing one or more features and functions, including those disclosed herein and/or other features and functions. In some implementations, intrusion detection application 215 modules may be implemented across multiple applications and/or devices within environment 100 to perform the intrusion detection functions described herein.

In operation, IDM 108 and/or application 215 are configured to form groups or clusters at least based on transactions between resource server 104 (and/or other similar servers) and client entities 106, and detect intrusion at resource server 104 based on current transaction(s) and the transaction-based clusters. In some implementations, clustering module 220 is configured to form transaction groups or clusters, e.g., based on transactions between users (e.g., of an enterprise) operating, or otherwise associated with, client entities 106 and resource server 104. Each transaction group or cluster may represent a set of transactions including one or more different types of transactions performed at resource server 104. Each user that accesses, or is authorized to access, resource server 104 (via one or more client entities 106) may be associated with, or may become a "member" of, at least one of the transaction groups or clusters formed by clustering module 220. Users who initiate, or are otherwise associated with, a common set of transactions (that includes similar transactions) may belong to a same cluster that represent at least those common transactions.

In some implementations, as part of the cluster-formation process, information from each of a set of users related to transactions to be performed at (or fulfilled by) resource server 104 and identity information of the corresponding user are recorded or stored at, e.g., memory 205. In some implementations, the transaction information is first stored in a memory associated with resource server 104, and then communicated (e.g., via network 114 or directly) to IDM 108 to be stored in memory 205. Such transaction information may include information related to the type(s) of the transactions, frequency of the transactions, risk information of the transactions, time of the transactions, login requirements to complete the transactions, information regarding the type(s) of client entities 106 (e.g., mobile, desktop, laptop, tablet) used for the transactions, modules and/or applications associated with resource server 104 involved with the completion of the transactions, and/or other information, e.g., related to functions and services of resource server 104. The transaction information for each user may be collected for a specific period of time that may be configurable at resource server 104 and/or IDM 108. The specific time period may be configured in terms of time equal to one or more average login sessions at resource server 104, hours, days, weeks, months, years, and/or other criteria.

In some implementations, clustering module 220 is configured to analyze and process the transaction information for all the users, and based at least on that, define transaction groups or clusters. In some implementations, defining transaction groups (by clustering module 220) includes defining the total number of groups, specifying the set of transactions represented by each group, assigning the users to one or more groups and/or other actions. Clustering module 220 may be configured to form groups based on a fuzzy clustering technique. Accordingly, clustering module 220 may be configured to initially process the transaction information collected for one period of time to choose a total number of groups and transactions represented by each group. Clustering module 220 may be further configured to randomly assign a coefficient to each user, wherein the coefficient represents a degree of belonging of that user in that group based on, e.g., pattern of transactions performed by that user. Clustering module 220 may be further configured to repeat the above clustering steps on transaction information collected for each subsequent period of time to update the transaction group definition including users' coefficients (representing users' memberships with groups) until the clustering algorithm converges or settles, e.g., when the change in the value of users' coefficients between two iterations or periods is no more than a given sensitivity threshold. In some implementations, the sensitivity threshold is configurable based on the type of transactions, type of applications or services supported by resource server 104 and/or other factors. In some implementations, clustering module 220 is configured to form transaction groups based on, in addition to collected transaction information, users' personal information, information related to users' demographic characteristics, time of the day, location of client entities 106, risk level of the transactions, features, functions and/or characteristics associated with client entities 106, and/or other factors.

In some implementations, clustering module 220 is configured to a create database of "settled" or "converged" transaction groups that includes, for each transaction group, information regarding a set of transactions represented by each group, and identity information of all of the users that are finally determined to be the members of that group. The database of transaction groups may be stored in memory 205. The set of transactions of the group to which a user is assigned may be considered as a "normal" set of transactions for that user, and, as discussed in detail below, a deviation detected from the normal transactions may represent a possible act of intrusion at resource server 104. In some implementations, clustering module 220 is configured to dynamically update the transaction groups in response to change in transactions performed by a majority of users in one or more groups, change in criteria used to define the number of groups and/or transactions represented by the groups, change in number and/or other criteria related to user membership to one or more groups, and/or other factors. In some implementations, dynamically updating the transaction groups (e.g., by clustering module 220) may include, but not limited to, disassociating one or more users from a group, associating one or more users with one or more transaction groups other than, or in addition to, the group with which the one or more users were previously associated, or both.

For example, in the case where environment 100 includes a typical banking environment and/or resource server 104 provides typical banking services and applications of a banking institution to authorized clients (or users) e.g., via entities 106, transaction information may include data related to typical banking transactions including, but not limited to, view balance, balance transfer from one account to another, deposits, and payments. Accordingly, in some implementations, clustering module 220 is configured to define groups or clusters based at least data related to recorded banking transactions. In one non-limiting example, clustering module 220 may define groups, each group representing specific numbers of view balances, balance transfers and payments processed—e.g., a first transaction group may represent 1-5 view balances, 1-3 balance transfers, and 1-6 payments; a second transaction group may represent 6-10 view balances, 4-7 balance transfers, and 7-12 payments; and so on. Accordingly, upon group formation, clustering module 220 may be configured to assign user(s) to (i.e., associate users' identity information with) one or more transaction groups in accordance with the transactions associated with each user. For example, if, in a specific time period, a user performs three view balances, one balance transfer and six payments, clustering module 220 may assign the user to the first transaction group. Following user assignment to the groups, clustering module 220 may store the transaction group information as well as assigned user information in a database stored in memory 205.

In another non-limiting example, environment 100 includes Internet services environment and/or resource server 104 provides Internet or web services. In this case, users' transaction information based on which the transaction groups are created may include sequences of uniform resource locaters (URLs) or a tuple of URL accessed via resource server 104, and/or some other variables in the data or query string posted by users via (an internet browser at) client entities 106. Additionally, or alternatively, transaction information may include time interval between different URL requests submitted by users at client entities 106 to server 104. A Trojan Horse would login and then access a link in much shorter time than a manual user can. In addition to the above transaction information, other factors related to server 104's services and functions, and/or related to client entities 106 may be used by clustering module 220 to define transaction groups. For example, in addition to the transaction information, clustering module 220 may consider factors, including, but not limited to, IP address, machine address, machine type, etc. associated with client entities 106 (that may be retrieved by monitoring network traffic information) to define transaction groups. In this example, clustering module 220 may be configured to define groups or clusters and assign users to those groups in accordance with the techniques described above. It will be understood by a person of ordinary skill in the art that the functionalities and features of clustering module 220 (and other components of environment 100 or system 102) are not limited to the above examples related to banking and web services. IDM 108 including clustering module 220, TAM 225 and response module 227 may be configured to perform clustering and intrusion detection functions for other environments supporting various other services and/or applications.

In some implementations, to detect whether one or more current transactions from a client entity 106 to resource server 104 indicates a possibility of an occurrence of an intrusion act, TAM 225 is configured to receive information related to the one or more current transactions. The type of such information of the current transactions may be at least partially similar to the type of transaction information used for group formation (as discussed above). In some implementations, the current transaction information may include information related to the business context of the transaction(s) including, but not limited to, the specific service(s) and/or application(s) being accessed, and specific actions being performed at resource server 104. Additionally, the current transaction information may include identity information of the user associated with the current transactions. The current transaction information may be received from resource server 104, e.g., from an Access Management System implemented within resource server 104, at IDM 108 and stored in memory 205, before being provided to TAM 225. Access Management Systems may be implemented at resource server 104 to protect critical applications, and facilitate provisioning of identities and entitlements, access management through enforcement of the provisioned entitlements for the user, and logging and audit trails for compliance.

In some implementations, TAM 225 is further configured to access the database of transaction groups (e.g., formed by clustering module 220 and stored in memory 205) to access and/or retrieve the transaction information of one or more transaction groups, e.g., with which the user associated with the current transactions is assigned. TAM 225 may be further configured to analyze or compare the current transaction information with respect to the transaction information of the one or more user-assigned transaction groups. In some implementations, if, based on such comparison by TAM 225, at least a part of the current transaction information is determined to be different than at least a part of the information related to the user's transaction group, TAM 225 is configured to indicate an occurrence of an intrusion act at resource server 104.

For example, in the non-limiting example related to banking environment discussed above, the user associated with the current banking transactions may be assigned to the first group representing 1-5 view balances, 1-3 balance transfers, and 1-6 payments, and the current banking transactions from the user may include ten view balances (e.g., in one login session or any other specified time period). Accordingly, the current transaction information received at TAM 225 would indicate ten view balances (e.g., along with the user's identity information). TAM 225, upon comparing the received transaction information (i.e., ten view balances) with the information related to the first transaction group (i.e., 1-5 view balances), would determine that the current transactions deviate from the normal transaction pattern associated with that user. Accordingly, TAM 225 may indicate that an intrusion act has occurred at resource server 104.

Additionally, or alternatively, TAM 225 may be configured to access and/or retrieve information related to one or more transaction groups other than the transaction group with which the user of the current transaction is associated. In some implementations, TAM 225 is configured to compare the received current transaction information with information related to one or more of those "other" transaction groups to determine whether at least a part of the received transaction information is similar to at least a part of the information related to the transaction groups. If so, TAM 225 may determine an act of intrusion may be occurring at resource server 104. For example, referring to the above example where resource server 104 includes a banking server and the current transactions include ten view balances by the user associated with the first transaction group, TAM 225 may receive the current transaction information and compare it with information related with, e.g., second transaction group representing 6-10 view balances, 4-7 balance transfers, and 7-12 payments. Upon comparison, TAM 225 may determine that the current transactions (i.e., 10 view balances) fall within the boundaries defined for the second transaction group (i.e., 6-10 view balances), and thus indicate deviation from the norm, or in other words, a possibility of an occurrence of an intrusion act at server 104.

In some implementations, TAM 225 is configured to compare the current transaction information with transaction information of all of the transaction groups in the database. In this case, TAM 225 may indicate that an intrusion act has occurred at resource server 104, if the received transaction information is determined to be not similar to the information related to any of the transaction groups, or in other words, different than the information related to all of the transaction groups. For example, again referring to the above example, if the current transactions include 100 view balances at server 104 by a user and if there are no groups representing 100 view balances, TAM 225 may indicate possibility of an intrusion at resource server 104.

In some implementations, based on a determination that the intrusion act has occurred at resource server 104 by TAM 225, response module 227 is configured to modify access privileges of the user associated with the one or more current transactions for accessing one or more of client entities 106, resource server 104, or a combination thereof. As such, response module 227 may be configured to communicate with Access Management System (and/or other systems) at server 104 regarding the possible intrusion and access privileges modification for the user. Response module 227 may be further configured to notify an administrative entity associated with server 104, client entities 106, or both about the intrusion act, so that an appropriate action may be taken to mitigate the intrusion and/or against the user. Additionally, or alternatively, response module 227 may be configured to record the received transaction information about the current transactions, the identity information of the associated user, and/or other information related to the detected intrusion, e.g., in a list of intrusion acts stored in memory 205 and/or a memory associated with server 104 or clients 106.

It should be appreciated that although modules 220, 225, 227 are illustrated in FIG. 2 as being co-located with a single processing unit, in implementations in which processor 210 includes multiple processing units, one or all of modules 220, 225, 227 may be located remotely from the other modules or components of IDM 108. However, in some implementations, remote modules 220, 225, 227 are configured to communicate and be functional with each other as well as with other modules or components of IDM 108. The description of the functionality provided by the different modules, i.e., modules 220, 225, 227 described above is for illustrative purposes, and is not intended to be limiting, as any of modules 220, 225, 227 may provide more or less functionality than is described. For example, one or more of modules 220, 225, 227 may be optional or eliminated, and some or all of its functionality may be provided by other ones of modules 220, 225, 227. As another example, processor 210 may be configured to execute one or more additional modules that may perform some or all of the functionality attributed below to one of modules 220, 225, 227.

Figure 3:
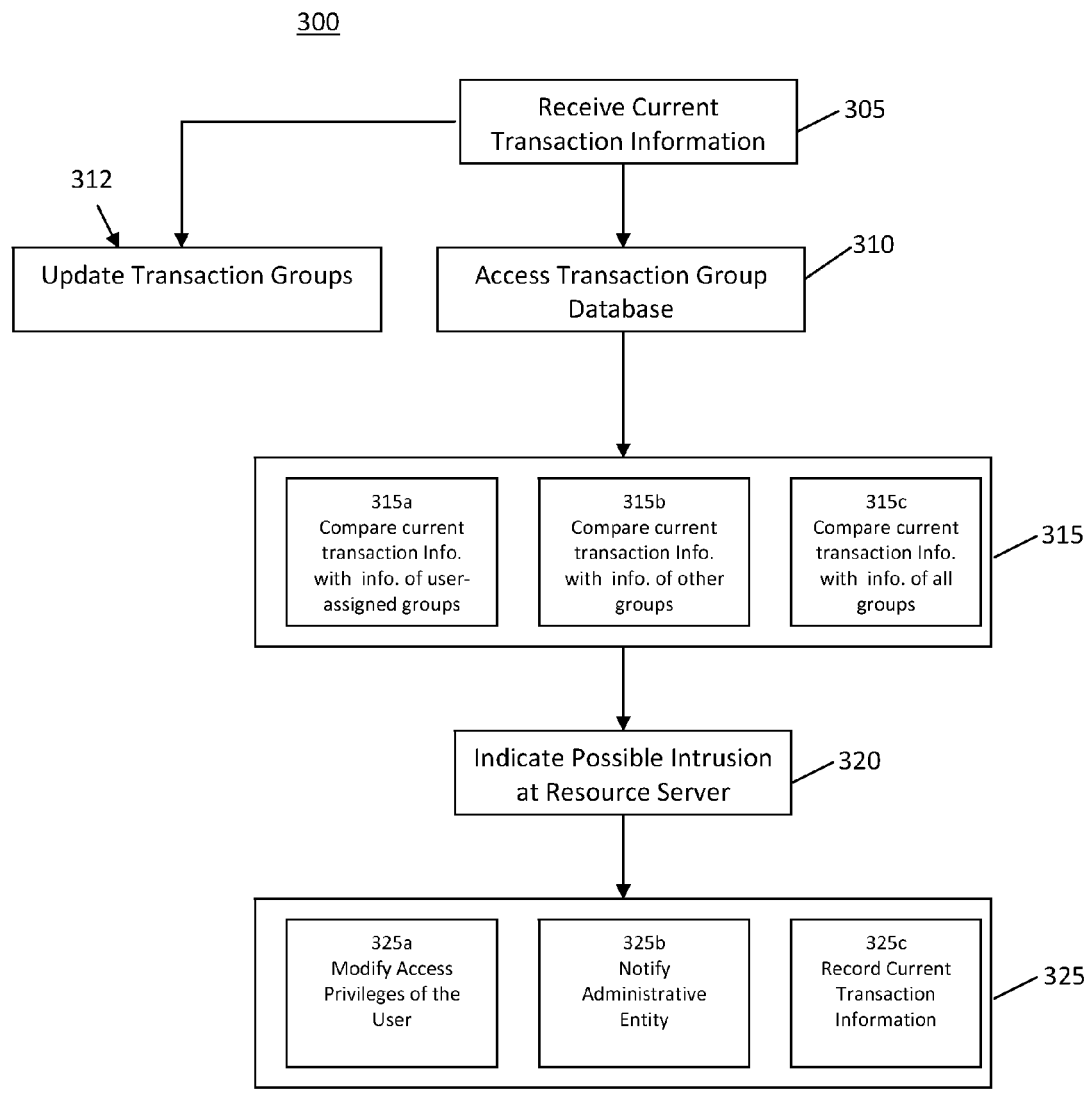
FIG. 3 illustrates an example of instruction flow between various components for intrusion detection, according to various implementations described in this disclosure.

FIG. 3 illustrates a process 300, which is an example of an intrusion detection process performed using, or otherwise associated with, IDM 108 and/or application 215. In some implementations, process 300 may be performed by one or more processors (e.g., processor 210). Process 300 includes an operation 305, in which information related to one or more current transactions initiated by a user (along with identity information of the user), e.g., logged-in at a client entity 106, for resource server 104 is received at TAM 225. In operation 310, TAM 225 may access the database of the transaction groups stored, e.g., in memory 205. As discussed above, the transaction groups are defined by clustering module 220, e.g., based on past transactions between client entities 106 and resource server 104. In operation 312, clustering module 220 may update the transaction groups based on the current transaction information and/or changes in one or more criteria related to group definitions or group memberships.

In operation 315, TAM 225 may analyze the received transaction information with respect to information related to one or more of the defined transaction groups. For example, in operation 315*a*, as discussed above, TAM 225 may compare the current transaction information with respect to the transaction information of one or more transaction groups with which the user of the current transactions is assigned. If, based on such comparison by TAM 225, at least a part of the current transaction information is determined to be different than at least a part of the information related to the user's transaction group, in operation 320, TAM 225 indicates an occurrence of an intrusion act at resource server 104.

In operation 315*b*, TAM 225 may compare the received current transaction information with information related to one or more transaction groups other than the user-assigned group to determine whether at least a part of the received transaction information is similar to at least a part of the information related to those "other" transaction groups. If so, in operation 320, TAM 225 indicates that an act of intrusion may be occurring at resource server 104. Further, in operation 315*c*, TAM 225 may compare the current transaction information with transaction information of all of the transaction groups in the database. In this case, if the received transaction information is determined to be different than the information related to all of the transaction groups, in operation 320, TAM 225 may indicate that an intrusion act has occurred at resource server 104.

Following indication of a possibility of an occurrence of an intrusion act at server 104, in operation 325, response module 227 generates information, data and/or signals to respond to the possible intrusion event. For example, in operation 325*a*, response module 227 may modify, or communicate with server 104 to modify, access privileges of the user associated with the current transactions for accessing one or more of client entities 106, resource server 104, or a combination thereof. In operation 325*b*, response module 227 may notify an administrative entity associated with server 104, client entities 106, or both about the intrusion act, so that an appropriate action may be taken to mitigate the intrusion and/or against the user. Additionally, or alternatively, in operation 325c, response module 227 may record the received transaction information about the current transactions, the identity information of the associated user, and/or other information related to the detected intrusion, e.g., in a list of intrusion acts stored in memory 205 and/or a memory associated with server 104 or clients 106 for future reference and/or processing.

Implementations of the invention may be made in hardware, firmware, software, or any suitable combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that one skilled in the art may be able to effect such feature, structure, or characteristic in connection with other aspects or implementations, whether or not explicitly described. Thus, various changes and modifications may be made to the provided description without departing from the scope or spirit of the invention. As such, the specification and drawings should be regarded as exemplary only, and the scope of the invention determined solely by the appended claims.

What is claimed is:

1. An intrusion detection system comprising a processor, and a memory with instructions which when executed by the processor cause the processor to perform a plurality of operations, the plurality of operations comprising:
   receiving transaction information related to a current transaction between a client entity and a resource server;
   accessing a database storing a plurality of transaction groups, wherein the transaction groups are formed based on a plurality of past transactions between a plurality of client entities and the resource server;
   analyzing the received transaction information with respect to information related to at least one of the plurality of transaction groups associated with a user, the user associated with the current transaction;
   based on said analyzing, determining a possibility of an occurrence of an intrusion act at the resource server; and
   dynamically updating the plurality of transaction groups based at least on the received transaction information, wherein said dynamically updating comprises disassociating the user from the at least one of the plurality of transaction groups, associating the user with a transaction group other than the at least one of the plurality of transaction groups, or both;
   obtaining identity information of the user; and
   based on a determination that the intrusion act has occurred at the resource server, one or more selected from:
      modifying access privileges of the user for accessing one or more of the plurality of client entities, the resource server, or a combination thereof,
      notifying an administrative entity about the intrusion act, or
      recording the received transaction information, the identity
   information, or both, in a list of intrusion acts.

2. The system of claim 1, wherein said analyzing comprises comparing the received transaction information with information related to the at least one of the plurality of transaction groups, and
   wherein said determining comprises determining that the intrusion act has occurred at the resource server, if, based on said comparing, at least a part of the received transaction information is different than at least a part of the information related to the at least one of the plurality of transaction groups.

3. The system of claim 1, wherein said analyzing comprises comparing the received transaction information with information related to one or more of the plurality of transaction groups excluding the at least one of the plurality of transaction groups, and
   wherein said determining comprises determining that the intrusion act has occurred at the resource server, if, based on said comparing, at least a part of the received transaction information is similar to at least a part of the information related to a transaction group other than the at least one of the plurality of transaction groups.

4. The system of claim 1, wherein said determining comprises determining that the intrusion act has occurred at the resource server, if, based on said analyzing, the received transaction information is different than information related to all of the plurality of transaction groups.

5. The system of claim 1, wherein the current transaction comprises at least one selected from: a banking transaction, a cloud computing transaction, or a web application transaction.

6. The system of claim 1, wherein the transaction groups are formed based on a fuzzy clustering technique.

7. A computer-implemented method of intrusion detection, the method executed by a processor configured to perform a plurality of operations, the plurality of operations comprising:
   receiving transaction information related to a current transaction between a client entity and a resource server;
   accessing a database storing a plurality of transaction groups, wherein the transaction groups are formed based on a plurality of past transactions between a plurality of client entities and the resource server;
   analyzing the received transaction information with respect to information related to at least one of the plurality of transaction groups associated with a user, the user associated with the current transaction;
   based on said analyzing, determining a possibility of an occurrence of an intrusion act at the resource server; and
   dynamically updating the plurality of transaction groups based at least on the received transaction information, wherein said dynamically updating comprises disassociating the user from the at least one of the plurality of transaction groups, associating the user with a transaction group other than the at least one of the plurality of transaction groups, or both;

obtaining identity information of the user; and based on a determination that the intrusion act has occurred at the resource server, one or more selected from:
- modifying access privileges of the user for accessing one or more of the plurality of client entities, the resource server, or a combination thereof,
- notifying an administrative entity about the intrusion act, or
- recording the received transaction information, the identity information, or both, in a list of intrusion acts.

8. The method of claim 7, wherein said analyzing comprises comparing the received transaction information with information related to the at least one of the plurality of transaction groups, and
wherein said determining comprises determining that the intrusion act has occurred at the resource server, if, based on said comparing, at least a part of the received transaction information is different than at least a part of the information related to the at least one of the plurality of transaction groups.

9. The method of claim 7, wherein said analyzing comprises comparing the received transaction information with information related to one or more of the plurality of transaction groups excluding the at least one of the plurality of transaction groups, and
wherein said determining comprises determining that the intrusion act has occurred at the resource server, if, based on said comparing, at least a part of the received transaction information is similar to at least a part of the information related to a transaction group other than the at least one of the plurality of transaction groups.

10. The method of claim 7, wherein said determining comprises determining that the intrusion act has occurred at the resource server, if, based on said analyzing, the received transaction information is different than information related to all of the plurality of transaction groups.

11. The method of claim 7, wherein the current transaction comprises at least one selected from: a banking transaction, a cloud computing transaction, or a web application transaction.

12. The method of claim 7, wherein the transaction groups are formed based on a fuzzy clustering technique.

13. A non-transitory computer-readable medium comprising computer-readable instructions, the computer-readable instructions when executed by a processor, causes the processor to carry out a plurality of operations, the plurality of operations comprising:
- receiving transaction information related to a current transaction between a client entity and a resource server;
- accessing a database storing a plurality of transaction groups, wherein the transaction groups are formed based on a plurality of past transactions between a plurality of client entities and the resource server;
- analyzing the received transaction information with respect to information related to at least one of the plurality of transaction groups associated with a user, the user associated with the current transaction;
- based on said analyzing, determining a possibility of an occurrence of an intrusion act at the resource server; and
- dynamically updating the plurality of transaction groups based at least on the received transaction information, wherein said dynamically updating comprises disassociating the user from the at least one of the plurality of transaction groups, associating the user with a transaction group other than the at least one of the plurality of transaction groups, or both;
- obtaining identity information of the user; and
- based on a determination that the intrusion act has occurred at the resource server, one or more selected from:
  - modifying access privileges of the user for accessing one or more of the plurality of client entities, the resource server, or a combination thereof,
  - notifying an administrative entity about the intrusion act, or
  - recording the received transaction information, the identity information, or both, in a list of intrusion acts.

14. The computer-readable medium of claim 13, wherein said analyzing comprises comparing the received transaction information with information related to the at least one of the plurality of transaction groups, and
wherein said determining comprises determining that the intrusion act has occurred at the resource server, if, based on said comparing, at least a part of the received transaction information is different than at least a part of the information related to the at least one of the plurality of transaction groups.

15. The computer-readable medium of claim 13, wherein said analyzing comprises comparing the received transaction information with information related to one or more of the plurality of transaction groups excluding the at least one of the plurality of transaction groups, and
wherein said determining comprises determining that the intrusion act has occurred at the resource server, if, based on said comparing, at least a part of the received transaction information is similar to at least a part of the information related to a transaction group other than the at least one of the plurality of transaction groups.

16. The computer-readable medium of claim 13, wherein said determining comprises determining that the intrusion act has occurred at the resource server, if, based on said analyzing, the received transaction information is different than information related to all of the plurality of transaction groups.

17. The computer-readable medium of claim 13, wherein the current transaction comprises at least one selected from: a banking transaction, a cloud computing transaction, or a web application transaction.

18. The computer-readable medium of claim 13, wherein the transaction groups are formed based on a fuzzy clustering technique.

* * * * *